United States Patent Office 3,393,075
Patented July 16, 1968

3,393,075
PROCESS FOR THE MANUFACTURE OF DRY SHORTENING
Yutaka Hayashi, Tokyo, and Noboru Takama, Omiya, Japan, assignors to Nippon Oils & Fats Company Limited, Tokyo, Japan, a corporation of Japan
No Drawing. Filed Aug. 20, 1964, Ser. No. 391,052
Claims priority, application Japan, Nov. 9, 1963, 38/60,140
11 Claims. (Cl. 99—118)

ABSTRACT OF THE DISCLOSURE

The preparation of dry shortening having a high fat content by forming an aqueous emulsion of 80 to 95% by dry weight of solid edible fat together with microcrystalline cellulose and a water soluble protein in a 9:1–1:9 ratio by weight and spray drying said emulsion.

---

This invention relates to a process for the manufacture of dry shortening in which microcrystalline cellulose and water-soluble protein are used. More particularly it relates to a process for the manufacture of powdered fat by mixing fats with microcrystalline cellulose and water-soluble protein in the proportion of between 1:9 and 9:1, emulsifying and spray-drying the mixture.

Previously, powdered fat products have been prepared by emulsifying protein, such as casein, gelatin or colloidal starch together with fat and spray-drying the mixture. The product has disadvantages in that the content of fat is limited at most to 70%, the stability of the product is low and its odor bad.

The principal object of this invention is to obviate the above disadvantages and to provide a powdered fat product in which the content of fat in the product is greater than 80%, and preferably greater than 90–95%. It is a further object to provide a product which has low deliquescence and hygroscopicity as well as excellent stability and odor.

By microcrystalline cellulose as used in the specification means such products, for example, as obtained according to U.S. Patent No. 2,978,446 by hydrolyzing α-cellulose with 2.5 N hydrochloric acid at 105° C. for 15 minutes to perfectly decompose the non-crystalline fraction of cellulose and drying the remaining crystalline fraction; or such product as obtained by hydrolyzing natural cellulose with mineral or organic acid (such as acetic acid), drying and grinding. It is different from α-cellulose in structure and property. The microcrystalline cellulose is ground mechanically with addition of water or fat into a thick colloid for use.

As water-soluble protein to be used together with microcrystalline cellulose, there are mentioned casein, gluten, soybean protein and the like, but it is not desirable to use gelatin in a large amount owing to its inherent odor. It is preferred to employ microcrystalline cellulose and water-soluble protein within the range of 1:9 to 9:1 in preparing the emulsion from which the fat product is obtained. The use of microcrystalline cellulose alone makes the emulsion unstable while the use of water-soluble protein alone does not give a finely powdered fat product nor one whose stability is adequate. Accordingly, it is necessary to use microcrystalline cellulose in conjunction with a water soluble protein within the range specified.

As fats there are mentioned animal and vegetable oils, and hydrogenated oils thereof, or natural butter fat which are solid at room temperature.

In the production of dry shortening according to the invention, 90–10% of one or more of water-soluble proteins is added to 10–90% of gelled microcrystalline cellulose according to the amount of powdered fat employed.

It desired, additives such as coloring matter, perfume, emulsifier for food etc. are added to form an aqueous mixed solution (A-liquid). At the same time, an emulsifier or condiment such as monoglyceride, acetoglyceride, sucrose fatty acid ester or the like is dissolved in an animal fat or vegetable oil or other fat (B-liquid). The liquids A and B are mixed to form a fine and homogeneous emulsion in conventional manner and spray-dried to yield a dry shortening. For example, milk casein is treated with trisodium phosphate or calcium hydroxide and sodium hydrogen carbonate etc. to form an aqueous casein solution. Microcrystalline cellulose is added to the aqueous solution, and said cellulose ground by a planetary mixer or roll mill etc. to form a gel of solid content in a desired concentration. An emulsifier or additive such as glyceryl lacto-palmitate, stearyl acid monoglyceride or the like and a fat is then added to the gel. The resulting mixture is emulsified at high pressure and high speed by means of a piston type emulsifying machine to form a stable O/W emulsion. The emulsion is spray-dried by a spray drier to yield a fine and homogeneous dry shortening.

As described above, dry fat products have been prepared by a process wherein an aqueous solution of casein or gelatin and colloidal starch is added to an edible fat to form a O/W emulsion and the water then evaporated by a spray drying process. The advantages of these previous powdered fat or shortening products, however, have not been sufficiently evident to warrant the cost of producing them. For example, while the mixing of powdered fats is simple and easy as compared to the use of butter, margerine or the like, previous powdered fat products have been less than satisfactory in their physical and confectionery properties and have not utilized to advantage other properties of the fat. In contrast, it has been found that in adding a powdered fat product prepared according to this invention to instant foods such as doughnut mix, cake mix, instant soup and the like, the workability of the mix and the stability of the fat product is superior while at the same time the confectionery and flavor preservation properties are improved.

According to this invention, microcrystalline cellulose is used as a coating agent and this characteristic is imparted to the dry shortening product. The dry fat product prepared according to this invention, therefore, has a high fat content and an improved deliquescence and hygroscopicity and may readily have incorporated therein perfume as well as flavor and color preservatives.

The dry shortening according to the invention is non-greasy and free-flowing and may be used for bread, cake, ice cream, milk shake, mayonnaise, instant food and the like. The dry shortening according to this invention shows uniform formation of breads or cakes when employed therewith, improved taste and flavor of the baked product. The dry shortening of this invention also shows a considerable improvement in the absorbing effect of the dough of breads and cakes, together with the great compact of dough and the decrease of oil absorption in case of soft doughnuts.

The following examples illustrate the invention further in detail.

Example 1

83 kg. of water and 600 g. of trisodium phosphate were charged in a mixing tub provided with a stirrer, to which 6.5 kg. of milk casein was added while heating at 60° C. to dissolve completely. 5.8 kg. of microcrystalline cellulose (dry weight) gelled previously with 15 kg. of water by a conventional roll mill and 500 g. of sucrose fatty acid ester were added with stirring. A molten blend fat (M.P. 37° C.) of hydrogenated lard and cotton seed oil (7:3) were added thereto and 3% of monoglyceride was added and homogenized by a homogenizer. The mixture was emulsified by an emulsifier machine under a pressure of 150 kg./cm.$^2$ while maintaining at about 60° C. The procedure was repeated two times. The emulsion was spray-dried at 85° C. The procedure was repeated two times. The chemical composition of the product was 0.3% water, 85.5% fat, 7.1% protein and 7.1% cellulose.

Example 2

6.6 kg. of milk casein were dipped in the same amount of water as in Example 1 for about 12 hours. 660 g. of calcium hydroxide and 6 liters of 0.2 M sodium hydrogen carbonate solution were added gradually while stirring to dissolve and 85 kg. of additional water were added. The pH of solution was adjusted to 6.8–7 (A-liquid). On the other hand, 5.8 kg. of microcrystalline cellulose, 15 liters of water and 530 g. of sucrose fatty acid ester were mixed and gelled by a conventional roll mill, and a molten blend fat (M.P. 31° C.) of edible hydrogenated fish oil (M.P. 36° C.) and rice bran salad oil (8:2) were added thereto and homogenized by a homogenizer while keeping at 60° C. (B-liquid). The A- and B-liquids were charged in a mixing tub equipped with a conventional homogenizer, pre-emulsified for 4 minutes while keeping at 60° C., passed once through a piston type emulsifier (pressure 400 kg./cm.$^2$) to yield a fine and homogeneous emulsion. The emulsion was spray dried at 125° C. by a spray drier to yield a dry shortening. The composition of components was 0.5% water, 85.7% fat, 7.3% protein and 6.5% cellulose.

Example 3

660 kg. of water and 3.72 kg. of trisodium phosphate were charged in a mixing tub fitted with a stirrer. 28.2 kg. of casein were added while keeping at about 60° C. 27.0 kg. of lactose, 4.8 kg. of sucrose fatty acid ester and 0.708 kg. of DHA (dehydro acetic acid) were added and then 56.28 kg. of microcrystalline celluose were added with stirring (A-liquid). On the other hand, 3.48 kg. of stearin monoglyceride, 3.60 kg. of glyceryl lacto-palmitate, 3.6 kg. of polyglycerin ester, 0.043 kg. of BHA and 0.043 kg. of BHT were dissolved in 446 kg. of a blend oil (M.P. 38° C.) of unhydrogenated steam lard and unhydrogenated kapok oil (7:3) (B-liquid). ⅛ of B-liquid was added to A-liquid with stirring and homogenized by a homogenizer. The mixture was emulsified under a pressure of 200 kg./cm.$^2$ by a piston type emulsifier into a fine and homogeneous emulsion while keeping the mixture at about 60° C. The procedure was repeated two times. The remainder of B-liquid (⅞ amount) was added to A-liquid and emulsified under a pressure of 300 kg./cm.$^2$ by the emulsifier. The procedure was repeated two times. The emulsion was spray-dried at 100° C. by a spray drier to yield a dry shortening. The composition of the product was 0.61% water, 81.1% fat, 4.92% protein and 4.98% cellulose.

Example 4

The same mixing composition and procedure were performed except for substituting natural butter fat (M.P. 30–35° C.) for the blend oil used in Example 3.

Example 5

The same mixing composition and procedure were performed except for substituting cotton seed oil (M.P. 30° C.) for the blend oil used in Example 3.

What we claim is:

1. A process for preparing a dry, finely divided, shortening product of improved deliquescence, stability and odor properties which comprises: forming an aqueous emulsion comprising about 80–95% by weight of at least one edible fat solid at room temperature selected from the group consisting of animal and vegetable fats and hydrogenated products thereof, and natural butter fat; a microcrystalline cellulose and a water-soluble protein in a weight ratio of 9:1 to 1:9; and a water-soluble edible emulsifier; and spray drying said emulsion to form said dry, finely divided, shortening product.

2. A process according to claim 1 in which an aqueous emulsion of said microcrystalline cellulose, said edible fat and said water-soluble emulsifier are brought together with an aqueous solution of said water-soluble protein, and the resultant emulsion spray dried.

3. A process according to claim 1 in which said microcrystalline cellulose is one prepared by hydrolyzing natural cellulose with a substance selected from the group consisting of mineral acids and acetic acid followed by drying and grinding.

4. A process according to claim 1 in which said water-soluble protein is selected from the group consisting of casein, gluten and soybean protein.

5. A process according to claim 1 in which said vegetable fat is cotton seed oil.

6. A process according to claim 1 in which said fat comprises hydrogenated lard and cotton seed oil in a weight ratio of 7:3.

7. A process according to claim 1 in which said fat comprises hardened edible fish oil and rice bran salad oil in a weight ratio of 8:2.

8. A process according to claim 1 in which said fat comprises unhydrogenated steam lard and unhydrogenated kapok oil in a weight ratio of 7:3.

9. A process according to claim 1 in which an emulsion comprising said edible fat and an oil-soluble edible emulsifier are brought together with an aqueous emulsion of said microcrystalline cellulose, said water-soluble protein and said water-soluble edible emulsifier, and the resultant emulsion spray dried.

10. A process according to claim 9 in which said oil soluble emulsifier is selected from the group consisting of stearyl monoglyceride, glyceryl lactopalmitate and polyglycerine ester.

11. A process according to claim 9 in which said water-soluble emulsifier is sucrose fatty acid ester.

References Cited

UNITED STATES PATENTS

| | | | |
|---|---|---|---|
| 2,392,833 | 1/1946 | Chapin | 99—118 X |
| 2,931,730 | 4/1960 | Schram | 99—118 |
| 3,170,795 | 2/1965 | Andre | 99—94 |
| 3,295,986 | 1/1967 | Saslaw et al. | 99—123 |

RAYMOND N. JONES, *Primary Examiner.*